(No Model.)

M. T. FOSTER.
HUB ATTACHING DEVICE.

No. 431,187. Patented July 1, 1890.

WITNESSES:

INVENTOR.
Marshal T. Foster.
BY
Hopkins and Atkins
ATTORNEYS.

UNITED STATES PATENT OFFICE.

MARSHAL T. FOSTER, OF MADISON, ASSIGNOR OF ONE-HALF TO AUGUST WEHRMAN, OF EMPORIA, KANSAS.

HUB-ATTACHING DEVICE.

SPECIFICATION forming part of Letters Patent No. 431,187, dated July 1, 1890.

Application filed April 29, 1890. Serial No. 349,910. (No model.)

*To all whom it may concern:*

Be it known that I, MARSHAL T. FOSTER, of Madison, in the county of Greenwood and State of Kansas, have invented a certain new and useful Improvement in Devices for Attaching Vehicle-Hubs to Axles, of which the following is a specification, reference being had to the accompanying drawings.

My invention relates to hub-attaching devices of that class in which the axle is provided with a shoulder which sets into the box, and a follower sliding loosely on the axle and screwing into the rear end of the box, instead of a nut upon the outer end of the axle.

The object of my invention is to provide a secure means of attaching a wheel to its axle, so constructed that dust, water, and every other injurious substance will be absolutely excluded, and at the same time I provide means for taking up any wear that may occur between the shoulder on the axle and the box.

Figure 1:
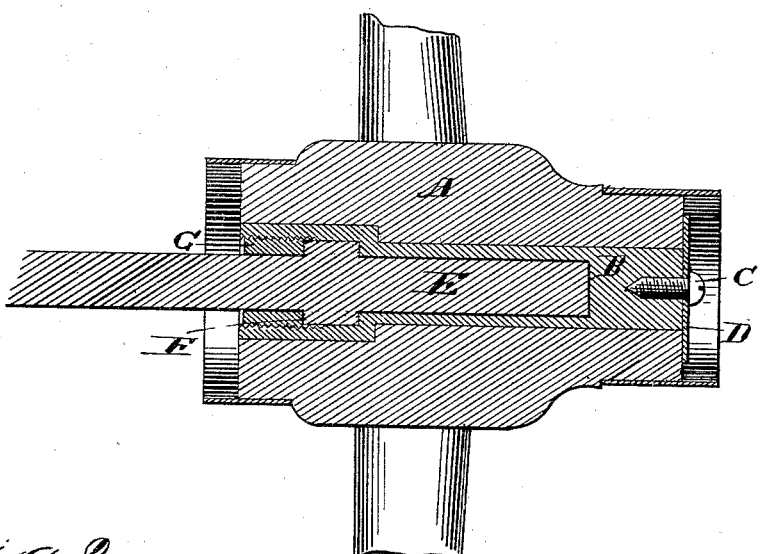
Figure 2:
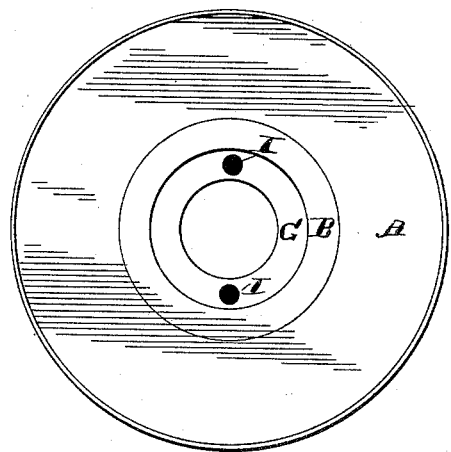
Figure 3:
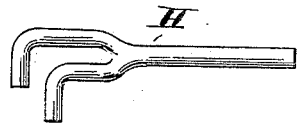

In the accompanying drawings, Figure 1 is a central vertical section of a hub and axle secured together by my invention. Fig. 2 is an elevation of the inner end of the hub, and Fig. 3 is a detached view of the wrench for operating the nut.

Referring to the letters upon the drawings, A indicates an ordinary hub provided with a box B, which is internally screw-threaded at its outer end to receive the screw C, which passes through an orifice in the covering-plate D and is adapted to hold the box securely in its place in the hub. The box is bored out to receive the axle E. At the inner end of the box is an enlarged aperture internally screw-threaded through part of its length and adapted to seat the shoulder F, which is preferably made integral with the axle.

G indicates a headless nut which fits close around the axle, but may be slipped longitudinally on it, and is adapted to be screwed into the aperture in the inner end of the box and against the shoulder F. Any convenient means may be provided for operating this nut—for instance, a two-pointed wrench H, adapted to take into the holes I in the end of the nut.

The principal advantage of the nut which I have described is that it is made without a head and may be sunk entirely into the end of the box. By this means it may be securely fastened in place and prevented from being dislocated by striking against any outside object; but its special utility is that by reason of its peculiar construction it can be adjusted to compensate for any wear which may occur between the parts.

What I claim is—

In a hub-attaching device, the combination, with the box B, bored out to receive the axle, closed at its outer end and provided at its inner end with an enlarged opening having internal screw-threads, as described, of the axle having a shoulder F, and a headless nut adapted to be screwed into the ends of the box against the shoulder F, which is seated in the bottom of the enlarged opening to secure the hub in place, said enlarged opening being of equal diameter throughout its entire length, so that the headless nut may be screwed down against the shoulder to take up wear as fast as it occurs, substantially as set forth.

In testimony of all which I have hereunto subscribed my name.

MARSHAL T. FOSTER.

Witnesses:
S. F. WICKER,
A. WEHRMAN.